2,814,595
Patented Nov. 26, 1957

2,814,595
OPEN GEAR LUBRICANTS

Alan Beerbower and John B. Henderson, Baltimore, Md., assignors to Esso Research and Engineering Company, a corporation of Delaware No Drawing. Application March 28, 1955,
Serial No. 497,402

1 Claim. (Cl. 252—54)

This invention relates to lubricating compositions and more particularly relates to open gear lubricants of a grease consistency containing certain copolymers of isobutylene and styrene, which lubricants have long lubrication lives.

In the prior art, lubricants designed for heavy-duty service, for example for heavy and relatively large and rough open-type gears, have commonly consisted of viscous mineral lubricating bases of a grease consistency either alone or compounded with additive materials, such as fatty acid soaps, sulfonates and the like. Such lubricants when employed in open-type gears are exposed to the atmosphere, and because of this exposure the lubrication life of such gear lubricants has been relatively limited. This is due in part to contamination of dust and moisture from the air, and more largely to loss of lubricant by dripping and slinging off the gears.

It has now been found that the addition of a small amount of a copolymer of isobutylene and styrene to these types of lubricants substantially increases their lubrication life. The isobutylene-styrene copolymers useful in the present invention are those having an intrinsic viscosity in the range of about 0.6 to 1.5, a molecular weight in the range of about 20,000 to 50,000, and a styrene content in the range of about 40 to 60% by weight. Preferably, the isobutylene-styrene copolymer contains about 50% by weight of the styrene component. Generally, these copolymers are incorporated in the open gear lubricant at a concentration in the range of about 0.1 to 5% by weight, based on the total composition, and preferably at a concentration in the range of about 0.5 to 2% by weight.

In general, the open gear lubricants of this invention comprise a major proportion of a viscous mineral lubricating base having an S. S. U. viscosity at 210° F. in the range of about 800 to 6,000 and about 0.1 to 5% by weight, based on the total composition, of a copolymer of isobutylene and styrene having an intrinsic viscosity in the range of about 0.6 to 1.5 and containing between 40 and 60% by weight of the styrene component. Preferably, the mineral lubricating base is of petroleum origin and has a high asphalt and/or resin content. The preferred mineral lubricating bases have an S. S. U. viscosity at 210° F. in the range of about 1,000 to 3,000. In addition to the viscous mineral lubricating base and the isobutylene-styrene copolymer, the gear lubricant compositions of this invention may contain conventional gear lubricant additives, such as fatty acid soaps, sulfonates, and the like. The gear lubricants may be blended with a volatile solvent to reduce the viscosity of the lubricant compositions so that the lubricant compositions may be more easily applied to open gears.

The preparation of the isobutylene-styrene copolymers of this invention is well known. The isobutylene-styrene copolymers may be prepared by the methods suggested in the U. S. patent to Smyers, No. 2,274,749 wherein the copolymers are prepared by low temperature polymerization in the presence of a suitable catalyst. The copolymerization is effected by mixing the two reactants, isobutylene and styrene, with or without a mutual solvent, such as ethylene, propane, butane, methyl chloride, methyl fluoride, ethyl chloride, ethyl fluoride, refined naphtha, etc., and then after cooling the reactants to the desired low temperature, generally in the range of about −10 to −103° C. (below −103° C. styrene may begin to freeze out of some solvents), adding an active halide catalyst, such as boron fluoride or activated boron fluoride catalyst (.1% ether added), aluminum chloride, titanium tetrachloride, aluminum alkoxide-aluminum chloride complex, and the like. If desired, such catalyst may be dissolved in a solvent such as carbon disulfide, methyl chloride, methyl fluoride, ethyl chloride, or low molecular weight sulfur-free saturated hydrocarbons, at or below the boiling point of the catalyst solvent. The catalyst solution is then cooled down, filtered and added to the reaction mixture. Volatile solvents or diluents, such as propane, ethane, ethylene, methyl chloride, carbon dioxide, etc. may also serve as internal or external refrigerants to carry off the liberated heat of polymerization. After completion of the copolymerization, any residual catalyst is killed or inactivated with alcohol, for example, isopropyl alcohol, and excess catalyst is removed by washing the product (which was precipitated out of solution by the alcohol) with water and preferably also with dilute aqueous caustic soda. The copolymers of this invention may also be prepared by the improved methods outlined in U. S. Patents 2,643,993 and 2,666,046.

The isobutylene-styrene copolymers useful in this invention have an intrinsic viscosity in the range of about 0.6 to 1.5 and preferably in the range of about 0.7 to 1.2. The term "intrinsic viscosity," as used in this specification, means the viscosity coefficient obtained according to the method set forth in an article by Paul J. Flory in J. A. C. S., volume 65, pages 372–382, 1943, entitled "Molecular Weights and Intrinsic Viscosity of Polyisobutylenes." Briefly, the intrinsic viscosity coefficient is a measure of the oil-thickening power of the copolymer which is approximately proportional to its molecular weight. The copolymers useful in this invention have a molecular weight in the range of about 20,000 to 50,000, and a styrene content in the range of about 40 to 60% by weight, preferably a styrene content of about 50% by weight. Copolymers of other compounds described in U. S. Patent 2,274,749 and having the above-described properties are also useful in increasing the lubrication life of gear lubricants.

The viscous mineral lubricating bases useful in this invention are those having a grease consistency which are preferably derived from petroleum crude oils having a high asphalt and/or resin content. The viscosity of the viscous mineral lubricating base should be about 800 to 6,000 and preferably about 1,000 to 3,000 S. S. U. at 210° F.

The preferred viscous mineral lubricating base is one which contains a high asphalt content. This particular type of lubricant base is well known in the art and may be obtained from natural asphalts such as natural Trinidad, Bermudez, Gilsonite, Grahamite and Cuban or may be obtained from an asphaltic petroleum crude oil, such as those of South America, California or Mid-Continent crudes, by removing the lighter fractions from the crude oil. The removal of these lighter fractions from a petroleum crude oil may be accomplished by well-known methods, for example, by steam distillation, by vacuum flashing in pipe stills, or by solvent separation. Steam distillation is carried out by treating a crude oil residuum, remaining after atmospheric distillation of light stocks, with steam sprays to remove additional light stocks, thereby producing a concentrated asphalt residuum. Vacuum flashing in pipe stills is a more efficient method for removing the light stocks from crude oil residua than is steam distillation as it may be carried out under vacuum at a lower temperature and thus prevents degradation of the products of this operation. Suitable viscous mineral lubricating bases may be also obtained by solvent separation of the asphalt content of crude residua from the light stock content. This method, which is also well known in the art, is accomplished by employing a light hydrocarbon solvent such as butane and propane. Also, suitable viscous mineral lubricating bases may be prepared by blending products of different viscosities, obtained by one or more of the above three mentioned methods, to thereby prepare a viscous mineral lubricating base of a desired viscosity. The asphaltic residua obtained by any of the above methods may be oxidized with air to produce lubricating bases having improved properties. Also, if desired, a heavy asphalt residua or natural asphalt may be "cut back" or blended with a heavy mineral oil to reduce the viscosity of the asphalt residua in order to prepare a mineral lubricating base having a suitable viscosity for the purposes of this invention.

Another type of viscous mineral lubricating base which may be utilized in this invention is a petroleum residuum having a high resin content, or a solvent precipitated resinous fraction derived therefrom. These residua or resinous precipitates may be blended with a heavy distillate if desired to prepare a mineral lubricating base of this invention. Such resin-containing residua may be obtained for example by solvent refining (e. g. propane precipitation of the resin) a Pennsylvania crude oil, which contains a substantial proportion of the resinous constituent. Certain crude oils may contain a substantial proportion of both asphalt and resin constituents and they may likewise be used in this invention.

Generally, therefore, the viscous mineral lubricating bases of this invention which have a grease consistency are preferably petroleum residua of high asphalt and/or resin content obtained by the removal of the light stocks from a crude oil by such means as distillation, solvent separation and the like. In certain applications, the viscous mineral lubricating bases may be combined with tars or pitches such as wood tar, coal tar, vegetable pitch, and the like, if desired.

The viscous mineral lubricating base represents a major proportion of the lubricant composition of this invention. Preferably it will represent about 85.00 to 99.9% by weight of the total lubricant composition. The isobutylene-styrene copolymers of this invention are utilized in a proportion sufficient to extend the lubrication life of the gear lubricant. Generally, the copolymers will be employed at a concentration in the range of about 0.1 to 5% by weight and preferably at a concentration in the range of about 0.5 to 2% by weight. In addition to the viscous mineral lubricating bases and the copolymers described above, it will be understood that various conventional additive materials may be also incorporated into the lubricants of this invention as will be apparent to those skilled in the art. Thus, anti-oxidants such as phenyl alpha naphthylamine, rust inhibitors such as oil-soluble sodium petroleum sulfonates or other similar alkali or alkaline earth sulfonates, tackiness agents, extreme pressure agents such as lead oleate, sulfurized fatty oils, etc., film-forming agents such as colloidal graphite and the like, may be added for particular purposes without departing from the spirit of the present invention.

Silicone compositions may also be incorporated into the lubricants of this invention so as to further increase the lubricant life, particularly in the presence of water. These silicone compositions consist essentially of a dimethyl silicone polymer having an S. U. S. viscosity at 210° F. in the range of about 300 to 3,000 thickened with about 4.0 to 20.0 wt. percent of finely divided silica. The dimethyl silicone polymers have the following general formula:

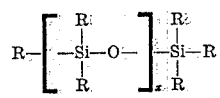

where R represents a methyl ($CH_3$—) group and $x$ is an integer sufficient to provide a polymer having the aforementioned viscosity. The preparation of these silicone polymers is well known in the art and is described, for example, in detail in the book "Chemistry of Silicones" by Eugene G. Rochow. Mixtures of different silicone polymers of the above general formula may be employed if desired. These silicones may be incorporated into the lubricants of this invention at a concentration in the range of about 0.05 to 3.0% by weight, preferably in the range of about 0.08 to 1.5% by weight. These silicone compounds are themselves useful, as additives in viscous mineral lubricating bases, for extending the lubrication life of open gear lubricants. The isobutylene-styrene copolymers of this invention, the silicone compositions and other additives may be simply incorporated into the viscous mineral lubricating base by mixing. The total lubricant composition should be of a grease consistency and should have an S. S. U. viscosity at 210° F. in the range of about 800 to 6,000 and the ingredients should be selected to formulate such a composition.

Since the lubricants of this invention are non-fluid and relatively viscous, it is preferred to blend them, especially the higher viscosity lubricants, with a volatile solvent such as trichlorethylene, carbon tetrachloride, naphtha, etc. so that they may be readily applied to open gears. A non-flammable volatile solvent is preferred. After a relatively short period of time, the volatile solvent evaporates, leaving the lubricant compositions of this invention adhering as a film to the open gears. By employing such volatile solvents, the necessity of heating such compositions prior to their application to open gears is eliminated. The amount added to the lubricant compositions of this invention should be sufficient to produce a semi-fluid composition, generally about 5 to 30% by weight based on the total solvent-free lubricant composition. Particularly preferred compositions containing a volatile solvent include a viscous mineral lubricating base, trichlorethylene and an isobutylene-styrene copolymer. These preferred compositions have the following formulation:

LUBRICANT COMPOSITION [1]

| Ingredient | Wt. percent (based on the total solvent-free composition) |
|---|---|
| Viscous mineral lubricating base [2] | 98.0–99.5 |
| Trichlorethylene (solvent) | 5.0–30.0 |
| Isobutylene-styrene copolymer [3] | 0.5– 2.0 |

[1] Composition may also include minor amounts of conventional gear lubricant additives.
[2] Derived from an asphaltic petroleum crude oil and having an S. S. U. viscosity at 210° F. in the range of about 1,000–3,000.
[3] Having an intrinsic viscosity in the range of about 0.7 to 1.2 and containing about 50% by weight of the styrene component.

The invention will be more fully understood by reference to the following examples. It is pointed out, however, that the examples are given for the purpose of illustration only and are not to be construed as limiting the scope of the present invention in any way.

*Example 1*

A viscous mineral lubricating base was prepared by mixing 58 parts by weight of an oxidized asphalt obtained from Lagunillas crude and having an S. S. U. viscosity at 210° F. of about 100,000 with about 42 parts by weight of a heavy petroleum distillate having an S. S. U. viscosity at 210° F. of about 70 and also obtained from Lagunillas crude oil. The resultant viscous mineral lubricating base had an S. S. U. viscosity at 210° F. of about 1500. The viscous mineral lubricating base was heated to about 300° F. and a small amount of an isobutylene-styrene copolymer having an intrinsic viscosity of about 1.0, a molecular weight of about 40,000 and containing about 50% by weight of the styrene component was added thereto. The resultant blend was thoroughly mixed at about 300° F. for about 3 hours. Thereafter, the resultant mixture was cooled and trichlorethylene was added. The resultant gear lubricant composition had the following formulation:

| Ingredient | Wt. Percent |
|---|---|
| Viscous mineral lubricating base | 89.0 |
| Trichlorethylene | 10.0 |
| Isobutylene-styrene copolymer | 1.0 |
|  | 100.0 |

Example II

A mixture of 1 part by weight of the copolymer described in Example I and 10 parts by weight of trichlorethylene was made at room temperature. Solution was complete in 4 hours with mixing. 11 parts by weight of the copolymer-trichlorethylene mixture was blended into 89 parts by weight of the viscous mineral lubricating base described in Example I, thereby producing a product having the identical formulation of that of Example I. This second procedure for formulating the gear lubricant composition is preferred since no heating is required.

Example III

A viscous mineral lubricating base derived from an asphaltic petroleum crude oil and having an S. S. U. viscosity at 210° F. of about 1500 was utilized in this example. This viscous mineral lubricating base was employed to formulate two gear lubricant compositions in accordance with this invention. One of the compositions, composition A, had the following formulation:

| Ingredient | Wt. Percent |
|---|---|
| Viscous mineral lubricating base | 89.0 |
| Trichlorethylene | 10.0 |
| Isobutylene-styrene copolymer [1] | 1.0 |
|  | 100.0 |

[1] The copolymer described in Example I.

The second gear lubricant composition, composition B, had the following formulation:

| Ingredient | Wt. Percent |
|---|---|
| Viscous mineral lubricating base | 99.0 |
| Isobutylene-styrene copolymer [1] | 1.0 |
|  | 100.0 |

[1] The copolymer described in Example I.

The viscous mineral lubricating base of this example and compositions A and B were then evaluated for lubricant life in an open gear test. The lubricants were applied to a pinion gear operating at 400 R. P. M. and having a gear tooth pressure of about 750 lbs.

The following results were obtained in the open gear test:

| Lubricant | Lubrication life (hrs.) |
|---|---|
| Viscous mineral lubricating base | 4.5 |
| Composition A | 6.0 |
| Composition B | 11.0 |

It will be noted that the addition of 1% by weight of the isobutylene-styrene copolymer to the viscous mineral lubricating base (to formulate composition B) increased the life of the lubricant by about 250% (11 hrs. vs. 4.5 hrs.). The addition of a volatile solvent to the lubricant composition containing the copolymer (to formulate composition A) resulted in a decrease in lubricant life (composition B vs. composition A). Nevertheless, composition A had a lubrication life about 33% greater than that of the viscous mineral lubricating base alone. A composition of the type illustrated by composition A is a preferred gear lubricant composition since it is one which may be readily applied to open gears and which, upon the evaporation of the volatile solvent (trichlorethylene) has an exceedingly long lubrication life (as illustrated by composition B).

What is claimed is:

An open gear lubricant consisting of: a lubricating base having an S. S. U. viscosity of about 1500 at 210° F., formed by admixing 58 parts by weight of an oxidized asphalt and 42 parts by weight of a heavy petroleum distillate; 1 wt. percent of an isobutylene-styrene copolymer having an intrinsic viscosity of about 1, a molecular weight of about 40,000, and containing about 50% by weight of styrene; and 10 wt. percent of trichloroethylene.

References Cited in the file of this patent

UNITED STATES PATENTS

| 2,274,749 | Smyers | Mar. 3, 1942 |
| 2,421,082 | Pier | May 27, 1947 |
| 2,472,495 | Sparks | June 7, 1949 |

OTHER REFERENCES

"Manufacture and Application of Lubricating Greases," by Boner-Reinhold Pub. Co., New York (1954), pages 798 and 922.